United States Patent
Cotten et al.

(10) Patent No.: US 10,774,679 B2
(45) Date of Patent: Sep. 15, 2020

(54) TURBINE ENGINE AIRFOIL ASSEMBLY

(71) Applicant: GENERAL ELECTRIC COMPANY, Schenectady, NY (US)

(72) Inventors: Stephanie Glynn Cotten, West Chester, OH (US); James Francis Brown, Cincinatti, OH (US); Theodore Robert Ingling, Morrow, OH (US); Tod Winton Davis, Liberty Township, OH (US); Gary Willard Bryant, Jr., Loveland, OH (US); Max Robert Farson, Greer, SC (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 15/892,630

(22) Filed: Feb. 9, 2018

(65) Prior Publication Data
US 2020/0123910 A1 Apr. 23, 2020

(51) Int. Cl.
| | |
|---|---|
| *F01D 5/14* | (2006.01) |
| *F01D 21/00* | (2006.01) |
| *F01D 5/20* | (2006.01) |
| *F01D 5/18* | (2006.01) |
| *F04D 29/32* | (2006.01) |

(52) U.S. Cl.
CPC ............ *F01D 21/003* (2013.01); *F01D 5/141* (2013.01); *F05D 2220/323* (2013.01)

(58) Field of Classification Search
CPC ........ F01D 21/00; F01D 21/003; F01D 21/04; F01D 21/045
USPC .............................................................. 416/2
See application file for complete search history.

(56) References Cited

U.S. PATENT DOCUMENTS

| | | | |
|---|---|---|---|
| 1,843,886 A | 2/1932 | Semmes | |
| 2,978,796 A | 4/1961 | Kemeny | |
| 8,251,640 B2 | 8/2012 | Beckford et al. | |
| 8,864,465 B2* | 10/2014 | Viegas | F01D 21/045 416/2 |
| 9,530,201 B2 | 12/2016 | Marolle et al. | |
| 9,650,914 B2 | 5/2017 | Lecuyer et al. | |
| 9,804,128 B2 | 10/2017 | Yamamoto et al. | |
| 9,835,047 B2* | 12/2017 | Whitehead | F01D 21/045 |
| 2010/0158693 A1 | 6/2010 | Viegas et al. | |
| 2015/0330246 A1 | 11/2015 | Whitehead et al. | |

* cited by examiner

*Primary Examiner* — Richard A Edgar
(74) *Attorney, Agent, or Firm* — McGarry Bair PC

(57) ABSTRACT

An airfoil assembly for a turbine engine includes an airfoil with an outer wall having a pressure side and a suction side, the airfoil extending axially between a leading edge and a trailing edge to define a chord-wise direction and also extending radially between a root and a tip to define a span-wise direction. An aperture and at least one slot can define at least a portion of a release plane extending through the outer wall.

25 Claims, 4 Drawing Sheets

TURBINE ENGINE AIRFOIL ASSEMBLY

BACKGROUND

Turbine engines, and particularly gas or combustion turbine engines, are rotary engines that extract energy from a flow of pressurized combusted gases passing through the engine onto rotating blade assemblies.

The blade assemblies can experience rotational forces or stresses in operation. It can be beneficial to perform strength or safety tests of the blade assemblies, including tests where the blade can break free during operation of the turbine engine.

BRIEF DESCRIPTION

In one aspect, the disclosure relates to an airfoil assembly for a turbine engine including an airfoil with an outer wall having a pressure side and a suction side, the airfoil extending axially between a leading edge and a trailing edge to define a chord-wise direction and also extending radially between a root and a tip to define a span-wise direction. The airfoil assembly can also include an aperture extending through the outer wall between the pressure side and the suction side, a first slot having a first axial width, the first slot extending through at least a portion of the outer wall between the pressure side and the suction side, and also extending radially along the outer wall, a second slot having a second axial width, the second slot being spaced from the first slot in the chord-wise direction and extending through at least a portion of the outer wall between the pressure side and the suction side, and also extending in the span-wise direction along the outer wall, and a release cut extending through at least a portion of the outer wall between the pressure side and the suction side, the release cut connecting the first slot and the second slot. The aperture, the first slot, the second slot, and the release cut define at least a portion of a release plane extending through the outer wall between the leading edge and trailing edge, and also extending along the outer wall in the span-wise direction.

In another aspect, the disclosure relates to a turbine engine including a fan, a compressor, a combustor, and a turbine in axial flow arrangement. At least one of the fan, the compressor, and the turbine can have an airfoil assembly including an airfoil with an outer wall having a pressure side and a suction side, the airfoil extending axially between a leading edge and a trailing edge to define a chord-wise direction and also extending radially between a root and a tip to define a span-wise direction. The airfoil assembly can also include an aperture extending through the outer wall between the pressure side and the suction side, a first slot having a first axial width, the first slot extending through at least a portion of the outer wall between the pressure side and the suction side, and also extending radially along the outer wall, a second slot having a second axial width, the second slot being spaced in the chord-wise direction from the first slot and extending through at least a portion of the outer wall between the pressure side and the suction side, and also extending in the span-wise direction along the outer wall, and a release cut extending through at least a portion of the outer wall between the pressure side and the suction side, the release cut connecting the first slot and the second slot. The aperture, the first slot, the second slot, and the release cut define at least a portion of a release plane extending through the outer wall between the leading edge and trailing edge, and also extending in the span-wise direction.

In yet another aspect, the disclosure relates to a method of forming a releasable airfoil for a turbine engine including forming in the airfoil a release cut having both a radial and axial component in the airfoil, forming in the airfoil at least one radial slot intersecting the release cut, forming in the airfoil an explosive charge aperture, and forming in the airfoil a ligament connecting the explosive charge aperture to the at least one radial slot.

DESCRIPTION OF EMBODIMENTS

Figure 1:
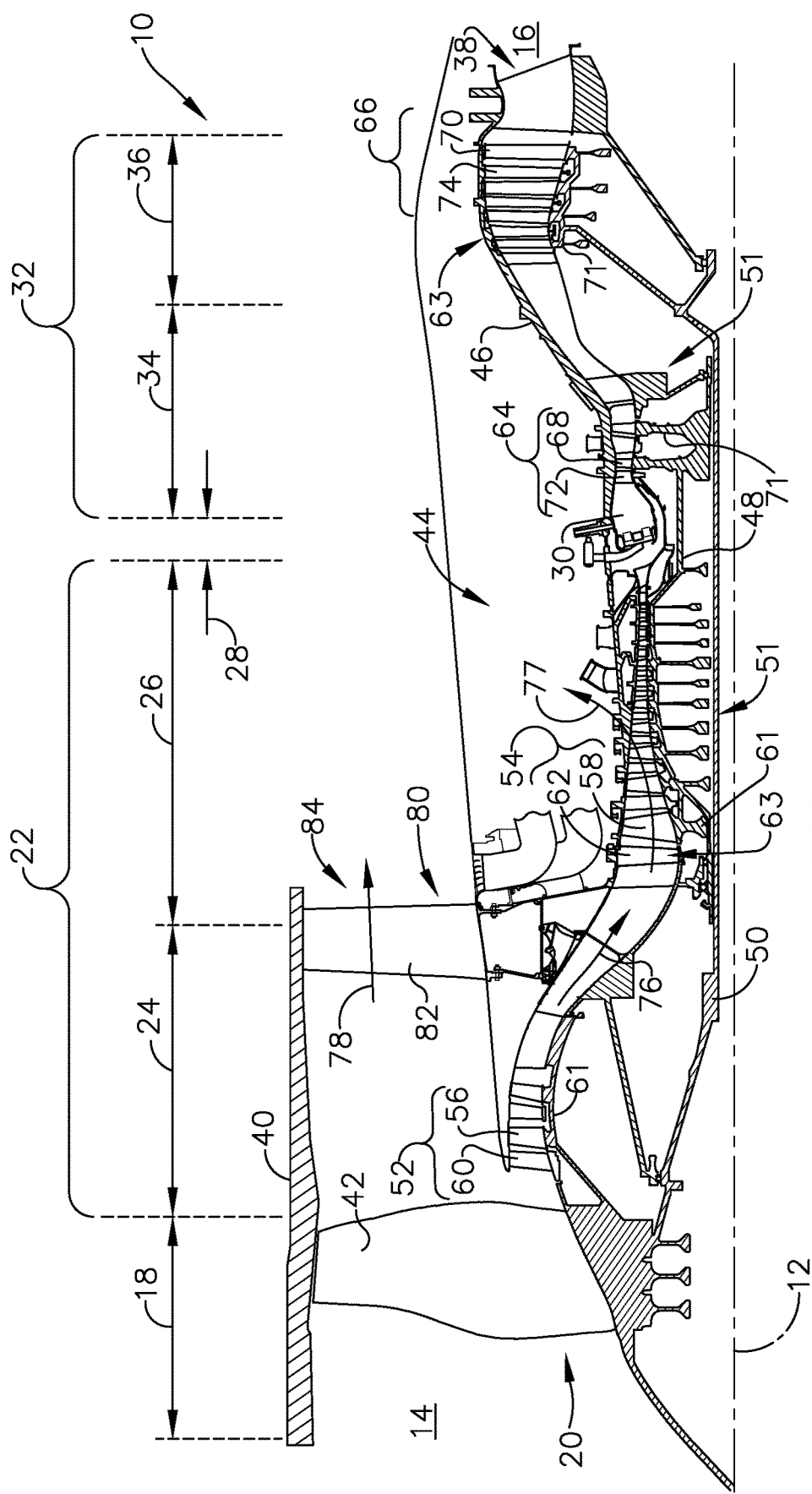
FIG. 1 is a schematic cross-sectional diagram of a turbine engine for an aircraft including an airfoil assembly according to various aspects described herein.

The described embodiments of the present disclosure are directed to a releasable blade for a turbine engine. For purposes of illustration, the present disclosure will be described with respect to the turbine section for an aircraft turbine engine. It will be understood, however, that the disclosure is not so limited and may have general applicability within an engine, including the fan or compressor section, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, including a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
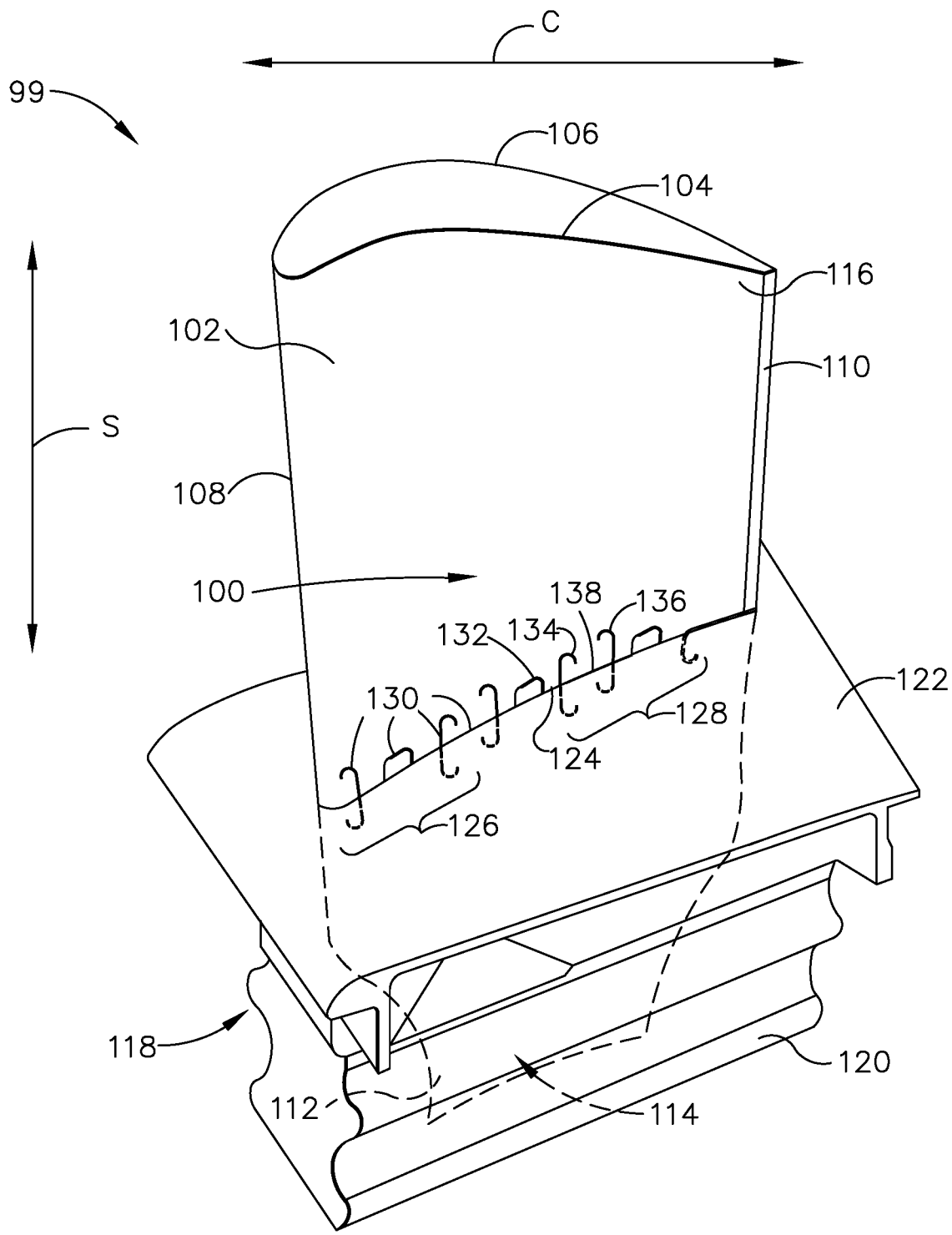
FIG. 2 is an isometric view of the airfoil assembly of FIG. 1.

Referring now to FIG. 2, the turbine engine 10 can further include an airfoil assembly 99 which can be located anywhere within the engine 10, including the fan section 18, compressor section 22 or turbine section 32 of FIG. 1. The airfoil assembly 99 includes an airfoil 100, and it should be understood that the airfoil 100 can include any stationary or non-stationary airfoil, e.g. a vane or a blade, within the turbine engine 10.

The airfoil 100 includes an outer wall 102 having a pressure side 104 and suction side 106. The outer wall 102 includes a pressure side 104 and suction side 106 and extends axially from a leading edge 108 to a trailing edge 110 to define a chord-wise direction C, and also extends radially from a root 112 to a tip 116 to define a span-wise direction S as shown. The airfoil 100 is illustrated herein as having a solid interior, and it is also contemplated that the outer wall 102 can bound a hollow interior as desired. In addition, the airfoil 100 can be made from a composite material or fibrous composite material, or metal, or any other desired material suitable for the environment of the turbine engine 10.

The airfoil assembly 99 also includes a hub 118, illustrated as a dovetail 120 with a platform 122. The dovetail 120 can be coupled to the airfoil 100 at the root 112. The platform 122 can extend along the outer wall 102 radially outward from at least a portion 114 of the root 112 as shown.

In this manner, the platform 122 can form an interface 124 with the outer wall 102 where a first portion 126 of the interface 124 can be positioned radially inward from a second portion 128 of the interface 124. Furthermore, the platform 122 can also define a flowpath 123, where combustion gases moving along the flowpath 123 can also flow along the interface 124 with the outer wall 102.

The airfoil 100 can further include a plurality of cutouts 130 proximate the flowpath 123 and interface 124 along the outer wall 102. The cutouts 130 are illustrated as including an aperture 132, a radial first slot 134, a radial second slot 136 spaced from the first slot 134 in the chord-wise direction C, and a release cut 138 connecting the first and second slots 134, 136. It should be understood that the aperture 132, slots 134, 136, and release cut 138 can each extend at least partially through the airfoil 100 from the pressure side 104 to the suction side 106, including extending fully through the airfoil 100 as desired. In addition, the release cut 138 can be formed as a planar cut or curvilinear cut as desired. Furthermore, any or all of the aperture 132, first slot 134, second slot 136, or release cut 138 can be formed by methods such as waterjet cutting, drilling, laser cutting, or any method which is advantageous for the desired size or tolerance within the airfoil 100.

Figure 3:
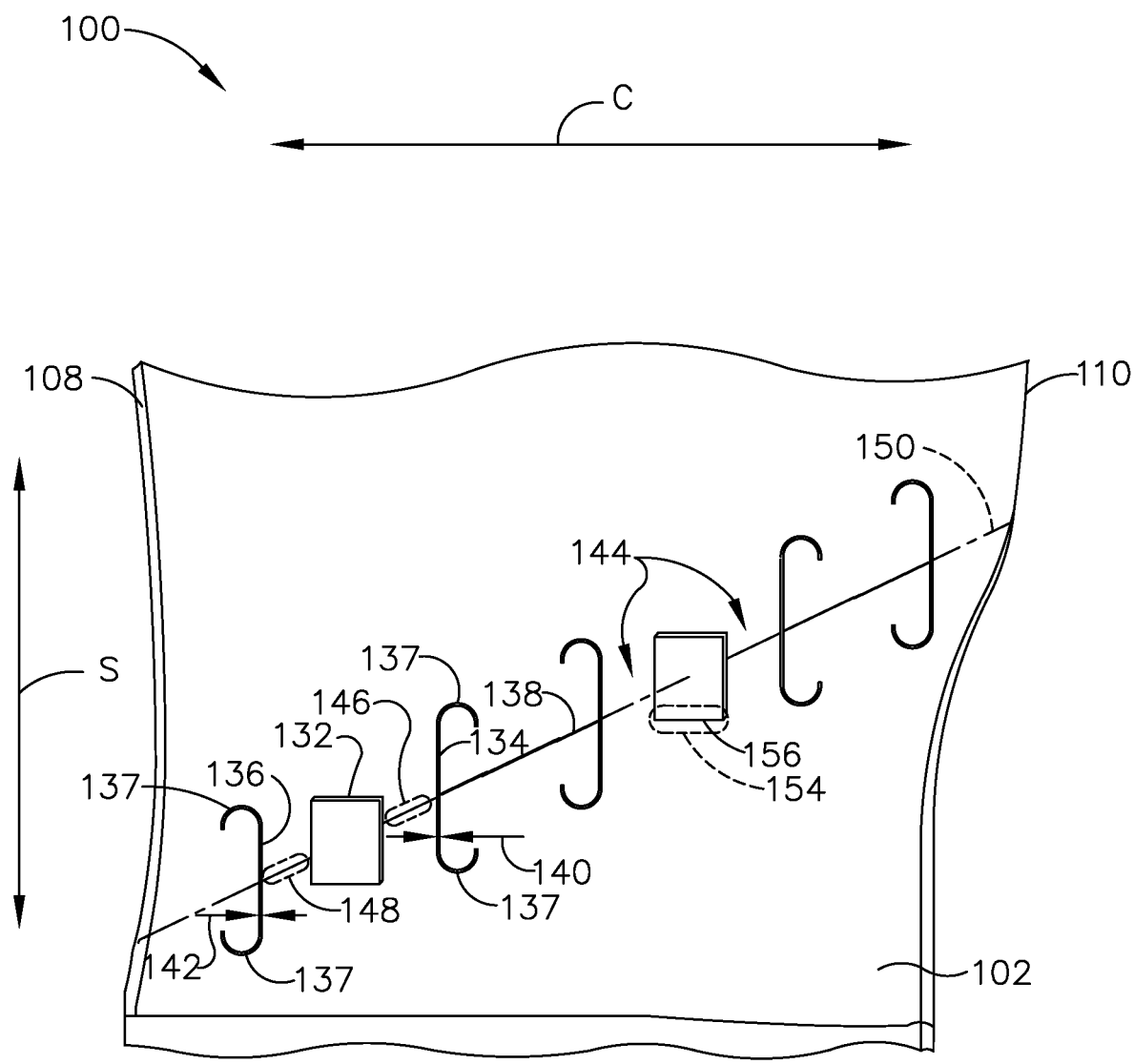
FIG. 3 illustrates the airfoil assembly of FIG. 2 including a release plane.

Referring now to FIG. 3, the first slot 134 includes a first axial width 140, and the second slot 136 includes a second axial width 142. In one non-limiting example the second axial width 142 can be smaller than the first axial width 140, such as smaller than 10% of the first axial width 140. It is also contemplated that the second axial width 142 can be the same size as, or larger than, the first axial width 140.

Either or both of the first and second slots 134, 136 can include a curved portion 137 extending in both the span-wise direction S and chord-wise direction C. It is also contemplated that the curved portion 137 can be formed solely in the span-wise direction S. In addition, a plurality of curved portions 137 can be utilized in the first or second slot 134, 136 as illustrated in the example of FIG. 3. The curved portion 137 can reduce local stresses in the airfoil outer wall 102 during operation of the engine 10, including any stresses that may otherwise be concentrated at the first or second slots 134, 136.

Additionally, the release cut 138 can extend along the outer wall 102 at least partially in the span-wise direction S as well as the chord-wise direction C as shown. In this manner, the first and second slots 134, 136 can be connected by the release cut 138 to form a continuous cutout 130 in the airfoil outer wall 102.

The aperture 132 can be spaced from the first slot 134 or the second slot 136 in the chord-wise direction C, thereby forming ligaments 144 in the outer wall 102 between the aperture 132 and either or both of the first and second slots 134, 136. A first ligament 146 can connect the aperture 132 to the first slot 134, and a second ligament 148 can connect the aperture 132 to the second slot 136, where the aperture 132 is located axially between the first and second ligaments 146, 148. It should be understood that the ligaments 144 can be defined as portions of the outer wall 102 that contain no cutouts 130, or as portions of the outer wall 102 that extend between adjacent cutouts 130.

A release plane 150 can be at least partially defined by the aperture 132, first slot 134, second slot 136, and release cut 138 at the interface 124. As used herein, "release plane" will refer to a separation surface between two components, and the separation surface may or may not be mathematically planar. Furthermore, a plurality of apertures 132, first and second slots 134, 136, release cuts 138, and ligaments 144 can also be utilized to form the release plane 150; in the example of FIG. 3, the release plane 150 is formed from a repeating pattern of the aperture 132, ligament 144, first slot 134, release cut 138, second slot 136, and ligament 144. It can be appreciated that the release plane 150 can extend fully through the outer wall 102 between the leading edge 108 and trailing edge 110, and also at least partially extend in the span-wise direction S.

In addition, the aperture 132 can be configured to receive an insertable component such as an explosive charge to aid in releasing the airfoil 100 along the release plane 150. The aperture 132 can include an alignment feature 154, illustrated as a flat portion 156. The aperture 132 is illustrated with an essentially square profile; however, any desired shape or profile is contemplated for the aperture 132, including round, squared with rounded corners, or irregular, in non-limiting examples.

Figure 4:
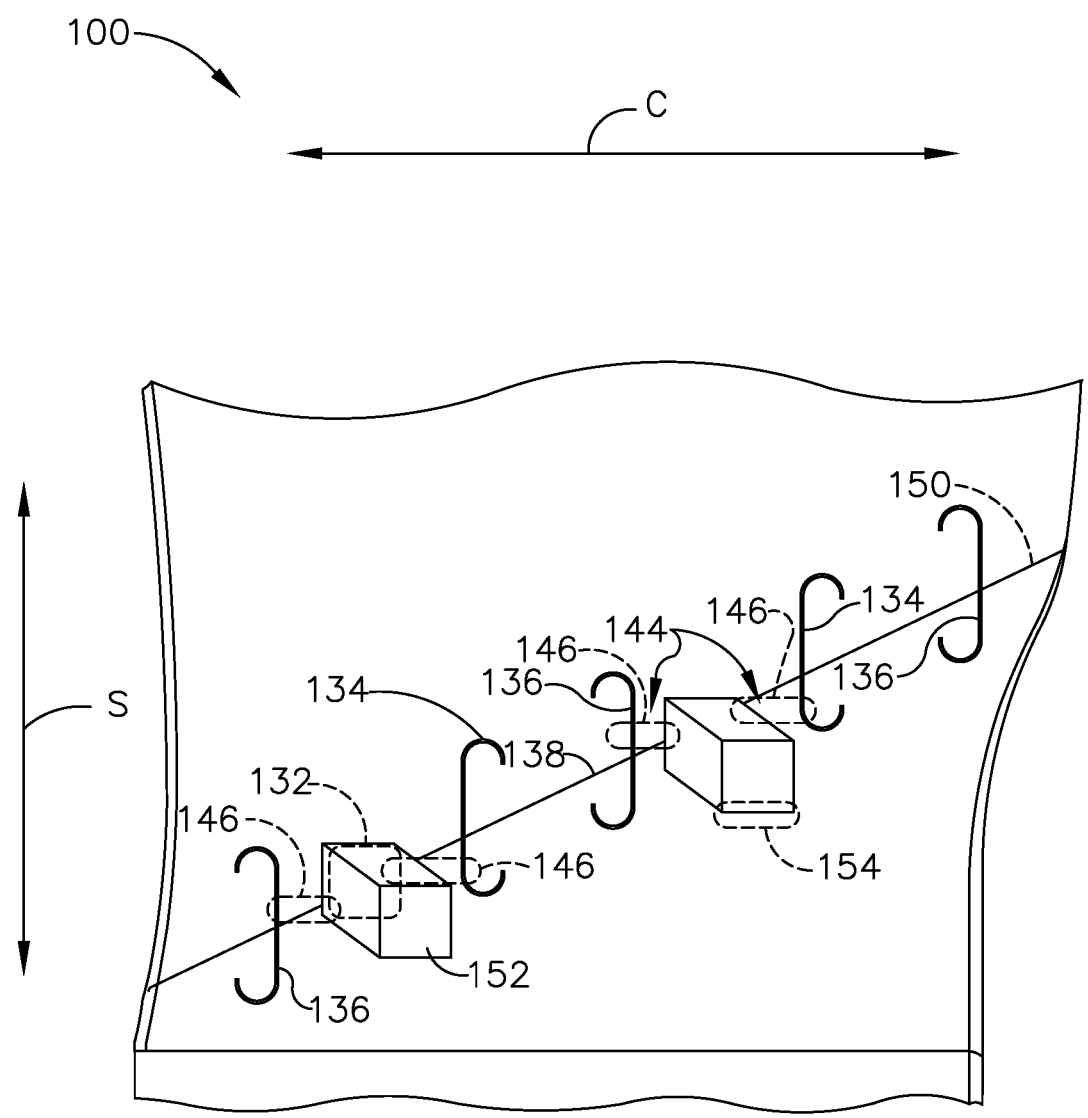
FIG. 4 illustrates the airfoil assembly of FIG. 3 including explosive charges.

FIG. 4 illustrates that the aperture 132 can have a complementary geometry with an explosive charge 152 for insertion into the aperture 132. It is contemplated that the flat portion 156 can be utilized to align the explosive charge 152 parallel to the engine centerline 12 of FIG. 1 within a 5 degree variance. In another example, the aperture 132 can be oriented perpendicular to the chord-wise direction S within a 5 degree variance. Other alignment features 154 can also be utilized; in non-limiting examples, the explosive charge 152 can include printed markings indicating which side to place along the flat portion 156, or the aperture 132 and explosive charge 152 can include a key and keyway, respectively (not shown), to ensure consistent alignment when assembling the charge 152 into the aperture 132.

In addition, the explosive charge 152 can be configured to release energy in a selected direction upon detonation. In the example of FIG. 4, the explosive charge 152 can be configured to release energy in the chord-wise direction C; in another non-limiting example, the explosive charge 152 can be configured to release energy uniformly in all directions. Furthermore, a plurality of apertures 132 each containing corresponding explosive charges 152 can be utilized along the release plane 150 as shown.

During operation of the engine 10, the ligaments 144 can be configured to fracture upon detonation of the explosive charges 152 while the airfoil 100 undergoes rotation. In the example of FIG. 4, the ligaments 144 can form fractures in the chord-wise direction C due to the chord-wise energy release direction of the explosive charges 152. The fractures can extend between adjacent cutouts 130, e.g. between an aperture 132 and adjacent first slot 134, or between an aperture 132 and adjacent second slot 136. It is contemplated that the fractured ligaments 144 can fully break apart due to a material failure under centrifugal forces, stresses, or loads within the airfoil 100 in operation. In one example where the airfoil 100 is made of a fibrous composite material, the fractured ligaments 144 can fully break apart due to fiber failure or separation under an operational load. In another non-limiting example where the airfoil 100 is metallic, the fractured ligaments 144 can fully break apart due to a failure in the metal under an operational load.

In still another example, an exemplary airfoil 100 made of a fibrous composite material had up to 90% of its cross-sectional area removed at the release plane 150 by way of the cutouts 130 e.g. apertures 132, first and second slots 134, 136, and release cuts 138. This exemplary airfoil 100 was still capable of withstanding 125% of a maximum designed load, e.g. maximum rotational or internal forces or stresses expected to be carried by the airfoil 100 in operation, before detonation of the explosive charges 152. The airfoil 100, after detonation of the charges 152, was then capable of withstanding 75% of the maximum designed load before release of the airfoil 100 due to fiber failure. In another example, the release plane 150 can be utilized to release the airfoil 100 at a pre-selected load, such as 100% of the maximum designed load for the airfoil 100.

It can be appreciated that the number and spacing of the cutouts 130 can be adjusted to customize a testing process for a variety of airfoils 100 as desired. Further, the relative widths of the first and second slots 134, 136, as well as their positioning with respect to the aperture 132, provide for a releasable airfoil 100 with minimal difference in performance under operational loads as compared to a non-releasable airfoil. In this manner the airfoil 100 can be released from the airfoil assembly 99 proximate the release plane 150, including by detonation of the explosive charges 152 in the apertures 132 or any subsequent material failure of the airfoil 100 post-detonation.

A method of forming a releasable airfoil 100 for the turbine engine 10 includes forming in the airfoil 100 the release cut 138 having both a radial component, e.g. in the span-wise direction S, and an axial component, e.g. in the chord-wise direction C. At least one radial slot can be formed in the airfoil 100, including the first slot 134 or the second slot 136, either or both of which can intersect the release cut 138. An explosive charge aperture 132 can also be formed in the airfoil 100, and ligaments 144 can be formed in the airfoil 100 connecting the explosive charge aperture 132 to at least one of the first or second radial slots 134, 136.

Benefits of the present disclosure include that the curved portion of the second slot, and the increased width of the first slot as compared to the second slot, can provide for a reduction in stress concentration at those locations in operation, which can minimize airfoil delamination at high loads. In addition, the first and second slots can provide connection points to aid in releasing the blade at a predictable time or exerted load in operation, and also reduces the needed strength of explosive charge or depth of explosive cut (e.g. fractured ligament) in order to reliably release the blade. Furthermore, the use of a release plane having both span-wise and chord-wise components provides for a more reliable airfoil release test based on a location that the airfoil is most likely to fracture under excessive loading. It can be appreciated that a more accurate replication of airfoil failure conditions can improve safety testing and increase the knowledge base in legacy, current, and future engine models.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine comprising:
an airfoil with an outer wall having a pressure side and a suction side, the airfoil extending axially between a leading edge and a trailing edge to define a chord-wise direction and also extending radially between a root and a tip to define a span-wise direction;
an aperture extending through the outer wall between the pressure side and the suction side;
a first slot having a first axial width, the first slot extending through at least a portion of the outer wall between the pressure side and the suction side, and also extending radially along the outer wall;
a second slot having a second axial width, the second slot being spaced from the first slot in the chord-wise direction and extending through at least a portion of the outer wall between the pressure side and the suction side, and also extending in the span-wise direction along the outer wall; and
a release cut extending through at least a portion of the outer wall between the pressure side and the suction side, the release cut connecting the first slot and the second slot;
wherein the aperture, the first slot, the second slot, and the release cut define at least a portion of a release plane extending through the outer wall between the leading edge and trailing edge, and also extending along the outer wall in the span-wise direction.

2. The airfoil assembly of claim 1 wherein the aperture is configured to receive an explosive charge.

3. The airfoil assembly of claim 2 wherein the explosive charge is configured to release energy in a selected direction.

4. The airfoil assembly of claim 2 wherein the explosive charge is configured to release energy uniformly in all directions.

5. The airfoil assembly of claim 2 wherein the aperture further comprises an alignment feature configured to orient the explosive charge within the aperture.

6. The airfoil assembly of claim 2 further comprising a ligament connecting the aperture to one of the first slot or the second slot.

7. The airfoil assembly of claim 6 wherein the ligament is configured to fracture upon detonation of the explosive charge.

8. The airfoil assembly of claim 1 further comprising a hub coupled to the airfoil proximate the root.

9. The airfoil assembly of claim 8 wherein the hub comprises a dovetail coupled to the airfoil at the root, as well as a platform extending along the airfoil outer wall at the release plane, the platform being positioned radially outward from at least a portion of the root.

10. The airfoil assembly of claim 1 wherein the second axial width is less than the first axial width.

11. The airfoil assembly of claim 1 wherein one of the first radial slot and second radial slot further comprises a curved portion extending in both the span-wise direction and chord-wise direction.

12. The airfoil assembly of claim 1 wherein the release cut is planar.

13. A turbine engine comprising a fan, a compressor, a combustor, and a turbine in axial flow arrangement, wherein at least one of the fan, the compressor, and the turbine comprises an airfoil assembly comprising:
- an airfoil with an outer wall having a pressure side and a suction side, the airfoil extending axially between a leading edge and a trailing edge to define a chord-wise direction and also extending radially between a root and a tip to define a span-wise direction;
- an aperture extending through the outer wall between the pressure side and the suction side;
- a first slot having a first axial width, the first slot extending through at least a portion of the outer wall between the pressure side and the suction side, and also extending radially along the outer wall;
- a second slot having a second axial width, the second slot being spaced in the chord-wise direction from the first slot and extending through at least a portion of the outer wall between the pressure side and the suction side, and also extending in the span-wise direction along the outer wall; and
- a release cut extending through at least a portion of the outer wall between the pressure side and the suction side, the release cut connecting the first slot and the second slot;
- wherein the aperture, the first slot, the second slot, and the release cut define at least a portion of a release plane extending through the outer wall between the leading edge and trailing edge, and also extending in the span-wise direction.

14. The turbine engine of claim 13 wherein the aperture is configured to receive an explosive charge.

15. The turbine engine of claim 14 wherein the explosive charge is configured to release energy in a selected direction.

16. The turbine engine of claim 14 wherein the aperture further comprises an alignment feature configured to orient the explosive charge within the aperture.

17. The turbine engine of claim 14 further comprising a ligament connecting the aperture to one of the first slot or the second slot.

18. The turbine engine of claim 17 wherein the ligament is configured to fracture upon detonation of the explosive charge.

19. The turbine engine of claim 13 further comprising a hub coupled to the airfoil proximate the root.

20. The turbine engine of claim 19 wherein the hub comprises a dovetail coupled to the airfoil at the root, as well as a platform extending along the airfoil outer wall at the release plane, the platform being positioned radially outward from at least a portion of the root.

21. A method of forming a releasable airfoil for a turbine engine, the method comprising:
- forming in the airfoil a release cut having both a radial and axial component in the airfoil;
- forming in the airfoil at least one radial slot intersecting the release cut;
- forming in the airfoil an explosive charge aperture; and
- forming in the airfoil a ligament connecting the explosive charge aperture to the at least one radial slot.

22. The method of claim 21 wherein forming the at least one radial slot comprises forming a first radial slot having a first width and a second radial slot axially spaced from the first radial slot and having a second width, wherein the release cut connects the first and second radial slots.

23. The method of claim 22 wherein the ligament connects the explosive charge aperture to one of the first or second radial slots.

24. The method of claim 21 wherein the at least one radial slot includes a first radial slot and a second radial slot, and wherein forming the ligament comprises forming a first ligament connecting the explosive charge aperture to the first radial slot, and forming a second ligament connecting the explosive charge aperture to the second radial slot, wherein the explosive charge aperture is located axially between the first and second ligaments.

25. The method of claim 21 wherein the ligament is configured to fracture upon detonation of an explosive charge.

* * * * *